United States Patent [19]

Marcum et al.

[11] Patent Number: 4,876,985
[45] Date of Patent: Oct. 31, 1989

[54] METHOD OF AND APPARATUS FOR BREEDING AND/OR RAISING SHELL FISH SUCH AS GIANT CLAMS

[75] Inventors: Bruce Marcum; Robert C. Reynolds, Bayview Heights, both of Australia

[73] Assignee: Pacific Clam Pty. Ltd., Australia

[21] Appl. No.: 42,157

[22] Filed: Apr. 24, 1987

[30] Foreign Application Priority Data

Apr. 24, 1986 [AU] Australia ............................... PH5615

[51] Int. Cl.⁴ ............................................... A01K 61/00
[52] U.S. Cl. ......................................................... 119/4
[58] Field of Search ...................................... 119/2, 3, 4

[56] References Cited

U.S. PATENT DOCUMENTS

| | | | |
|---|---|---|---|
| 237,351 | 2/1881 | Weems | 119/4 X |
| 3,653,358 | 4/1972 | Fremont | 119/3 |
| 4,422,408 | 12/1983 | Pohlhausen | 119/3 |
| 4,615,301 | 10/1986 | Maekawa et al. | 119/3 |

FOREIGN PATENT DOCUMENTS 2525862 11/1983 France ................................ 119/4
1009359 4/1983 U.S.S.R. ............................ 119/4

*Primary Examiner*—Robert P. Swiatek
*Attorney, Agent, or Firm*—Davis, Bujold & Streck

[57] ABSTRACT

A method of and apparatus for raising shell fish such as giant clams wherein fertilized eggs are obtained under laboratory conditions and then placed in a larvae tank. The tank float in sea water and has a platform base adapted to support juvenile clams during growth and flexible non-permeable side walls suspended from a ring of floats. The weight of the base tensions the side walls to a desired degree, allowing natural ocean movement to be transmitted to the water within the floating tank. At predetermined growth stages filtered ports are opened in the side walls allowing ocean water to flow through the larvae tank.

9 Claims, 4 Drawing Sheets

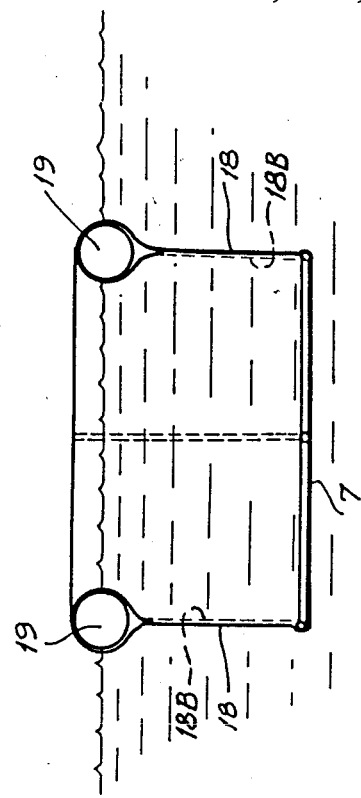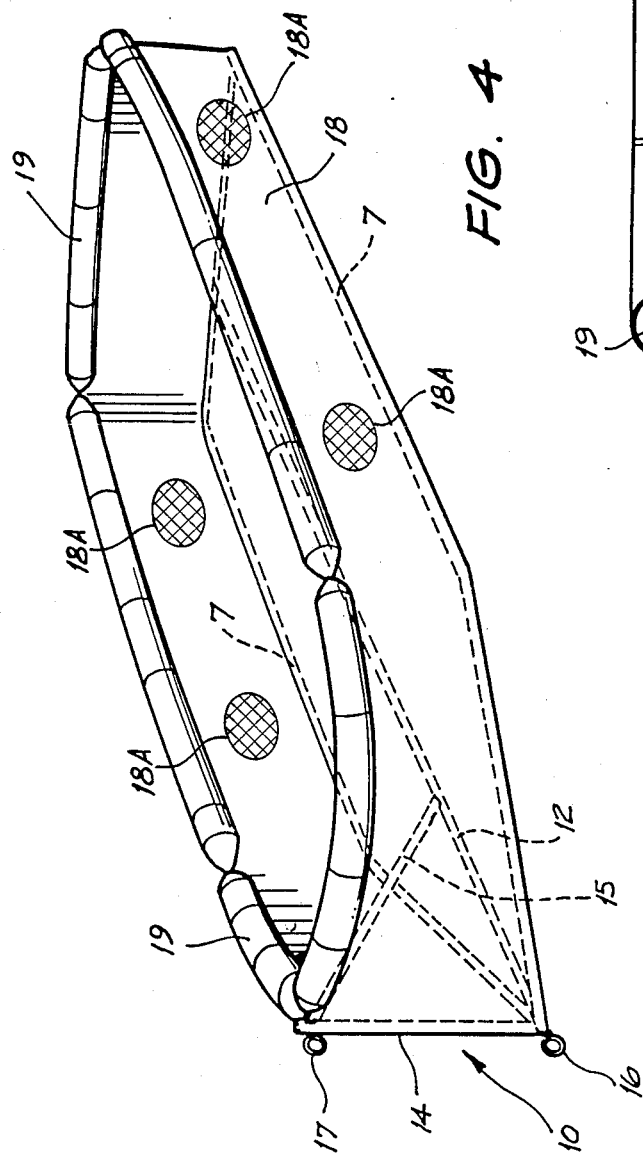

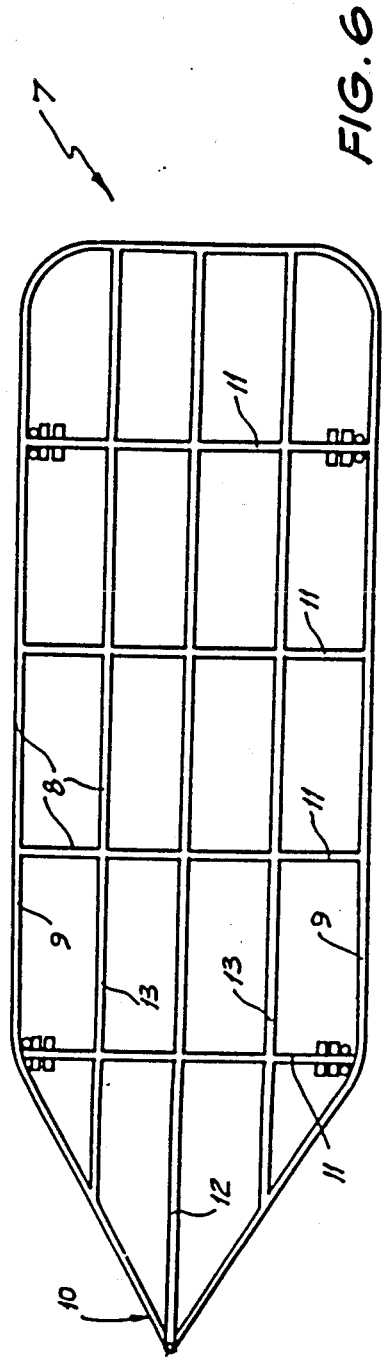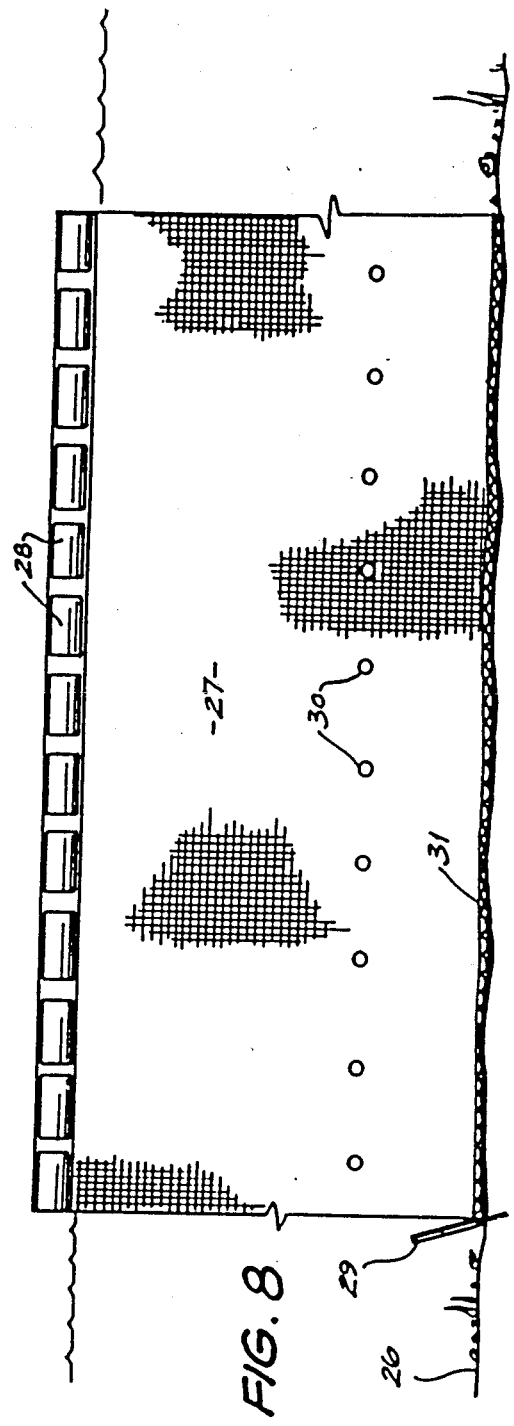

METHOD OF AND APPARATUS FOR BREEDING AND/OR RAISING SHELL FISH SUCH AS GIANT CLAMS

This invention relates to a method of and apparatus for breeding and/or raising shell fish and has been devised for particularly through not solely for the breeding and raising of giant clams.

BACKGROUND OF THE INVENTION

Giant clams are known in various tropical areas of the world such as the Australian Great Barrier Reef area and are recognised as forming part of the ecosystem of these areas. The numbers of giant clams are however decreasing due to commercial harvesting of the giant clams (often illegally) in order to satisfy the market for the flesh of the giant clam. To overcome this problem attempts have been made at the commercial farming of giant clams but such attempts have not always been successful due to the sensitivity of the clam, the difficulty of obtaining fertilized eggs, and the difficulty of raising juvenile clams from the fertilized egg stage. The clams are very sensitive to factors such as thermal shock and the fertilized eggs and/or juvenile clams can be attacked by various predators such as zoeplancta.

SUMMARY OF THE INVENTION

Accordingly in one aspect the invention may broadly be said to consist in a method of farming shell fish such as giant clams comprising the steps of placing fertilized eggs in a tank floating in sea water, said tank having flexible non-permeable sides, feeding the eggs as they grow to juvenile clams and settle on the bottom of the tank, allowing filtered sea water to pass through the tank once the juvenile clams have metamorphised into sedentary form, allowing the clams to grow to a predetermined size, and removing the clams from the tank.

Preferably the step of allowing filtered sea water to pass through the tank comprises the opening of filtered ports in the non-permeable, flexible sides of the tank.

Preferably the flexible non-permeable sides of the tank are replaced by fine mesh-like material allowing free movement of sea water through the tank, once the juvenile clams have grown to a desired size. Preferably the size of the mesh is sufficiently small to keep predators from entering the tank.

Preferably the method also incorporates the preliminary steps of breeding adult giant clams to obtain fertilized eggs by placing adult giant clams into a floating tank supported by buoyancy chambers, controlling the environment in the floating breeding tank to encourage the giant clams to breed, obtaining eggs and sperm separately from the adult clams in the breeding tank and mixing the eggs and sperm in controlled laboratory conditions before placing the fertilized eggs in the flexible larvae tank.

Preferably the method of farming giant clams also incorporates the step of placing the partially grown clams removed from the larvae tank into a protected enclosure on the sea bed and allowing the clams to grow to full size within the protected enclosure.

In a further aspect the invention may broadly be said to consist in a larvae tank for growing and raising fertilized eggs of shell fish such as giant clams, said larvae tank comprising a base frame having a substantially flat platform for the support of growing shell fish, a flexible sheet material side wall extending upwardly from the perimeter of the base frame, a ring of buoyant material extending around the upper edge of the side wall adapted to support the tank when floating in water, and anchor means arranged to locate the tank in a desired position relative to the sea bed.

Preferably the base frame is fabricated from pipe or tube or other similar material supporting a mesh floor adapted to support the growing giant clams.

Preferably the side wall is formed from flexible sheet polypropylene extending across the base frame and then upwardly from the perimeter of the base frame, and being wrapped around the buoyant material at the upper edge of the side wall. Preferably the side wall is provided with a pair of ports on opposite sides of the tank able to be opened permitting salt water in which the tank is floating to pass through the tank. Preferably the ports are provided with a filter mesh adapted to keep predators from passing into the tank and to retain any floating clams or fertilized eggs within the tank.

Preferably the tank is also provided with a layer of fine mesh netting located within the sheet material side walls and arranged such that at a predetermined point in the growth of giant clams within the tank, the flexible sheet material side walls may be removed, leaving the fine mesh in place and allowing water to pass through the tank being filtered by the fine mesh.

Preferably the base frame is weighted to provide a predetermined downward force on the flexible side wall, opposed to the buoyant upward force from the buoyant material at the upper edge of the side wall, such that the side wall is tensioned to a predetermined degree allowing the side wall to flex with natural movement of water thereagainst, but keeping the side wall sufficiently tensioned to resist "snapping" from a loose to a highly tensioned condition under wave action.

In a still further aspect the invention may broadly be said to consist in a breeding tank for breeding giant clams comprising a compartment adapted to contain adult giant clams, buoyancy chambers adapted to support the tank so that the tank can float in water, and buoyancy control means adapted to control the buoyancy of the buoyancy chambers and hence the depth of immersion of the tank in the water.

Preferably the side walls of the compartment are provided with ports at predetermined heights arranged such that water may flow in or out of the compartment through the ports when the tank is submerged to a desired depth by the buoyancy control means.

Preferably the sides and bottom of the compartment are insulated so as to enable the temperature of the water contained within the compartment to be controlled relative to the temperature of the water in which the breeding tank is floating.

Preferably the compartment comprises an elongated trough and the buoyancy chambers comprise a pair of buoyancy tank arrayed along either side of the trough.

DESCRIPTION OF THE DRAWINGS

Notwithstanding any other forms that may fall within its scope, one preferred form of the invention will now be described by way of example only with reference to the accompanying drawings, in which:

FIG. 4 is a perspective view of a larvae tank according to a further aspect of the present invention;

FIG. 5 is a transverse cross section through the larvae tank shown in FIG. 4;

FIG. 6 is a plan view of the base frame used in the larvae tank shown in FIG. 4;

FIG. 8 is a diagrammatic cross sectional elevation of a sea bed enclosure for the raising of giant clams to adult size.

DESCRIPTION OF THE PREFERRED EMBODIMENT

In the preferred form of the invention giant clams are bred and raised in three distinct phases, each with their own specified equipment, which will now be described. It will also be appreciated that although the description relates to giant clams and has been devised particularly for the breeding and raising of giant clams, some of the technology may be adapted for use in raising other forms of marine life.

Figure 1:
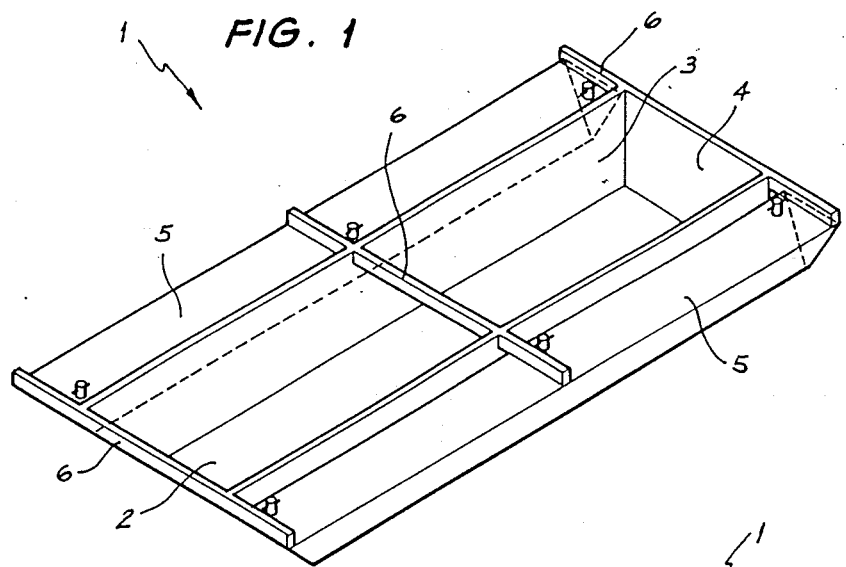
FIG. 1 is a perspective view of a breeding tank according to one aspect of the present invention.
Figure 2:
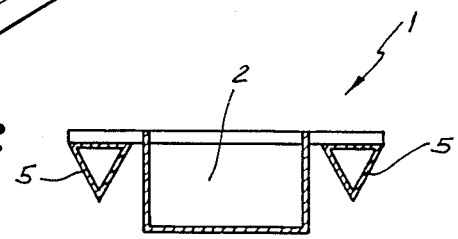
FIG. 2 is a transverse cross section through the tank shown in FIG. 1.
Figure 3:
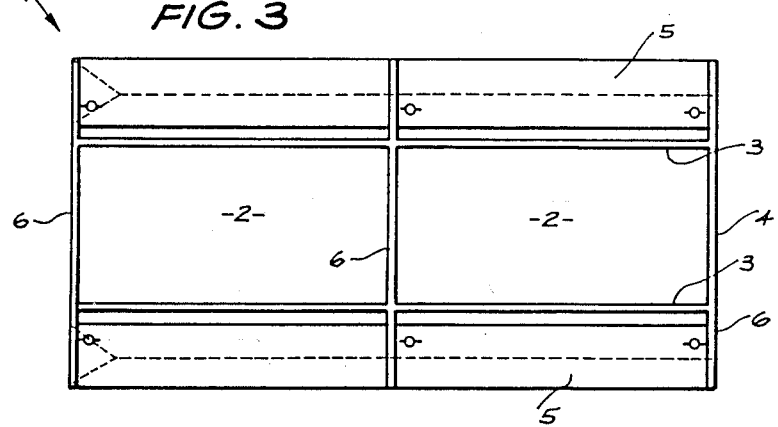
FIG. 3 is a plan view of the breeding tank shown in FIG. 1.

Adult giant clams are firstly bred in a breeding tank which is shown in FIGS. 1 to 3. The breeding tank is rigid in construction and is arranged to float in sea water so that it may be towed to the site of wild clams (or other adult clams previously bred by this process) which are then lifted directly into the breeding tank for reproduction. This gives a distinct advantage over prior art methods where wild clams are brought by boat to shore tanks and may be exposed for 24 hours or even longer. The shock of this exposure can kill the clams and/or rip the egg sacks so as to impair the breeding potential of the clams.

These problems are overcome by using the floating breeding tank (1) which comprises a central elongate or trough-like compartment (2) having closed sides and ends (3) and (4) and which is supported by elongated buoyancy chambers (5), typically triangular in section as shown in FIG. 2 which are arrayed on either side of the central compartment (2). The buoyancy chambers are conveniently supported by cross beams (6) at each end and at the mid-point of the tank (1). The breeding tank constructed in this manner is adapted to float in sea water and to be towed to the site of wild clams which can be lifted directly into the central compartment (2) which is also filled with sea water. The breeding operation can than take place more directly on site or the tank can be towed and moored in a convenient location for carrying out the breeding operation.

It is important for the breeding of the adult clams that the temperature of the water in the holding tank is controlled to encourage the production of sperm and eggs. To this end the sides (3) and (4) and the bottom of the compartment (2) are insulated to enable the temperature of the water in the compartment to be controlled by pumping different temperature water (e.g. drawn from different depths in the ocean, or heated) into the central compartment. Alternatively the water within the central compartment can be heated by pumping the water through a solar heat collector such as a black polythene pipe laid on the deck of the buoyancy chambers (5) or on an attendant support vessel.

The depth of the water in the tank can also be controlled by providing ports (not shown) in the side walls (3) and (4) and by flooding the buoyancy chambers (5) to a required degree to submerge the ports in the side of the tank. In this manner the inflow or outflow of sea water in and out of the central compartment (2) may be controlled by altering the buoyancy in the buoyancy chambers (5). It is also a feature of the tanks that the buoyancy chambers may be completely flooded to submerge the tank to the sea bed to resist wave action in the event of tropical cyclones or other violent storms.

Once the adult clams within the breeding tank have been encouraged to issue sperm and eggs by controlling the conditions within the tank, the sperm and eggs are taken separately from the tank and mixed in controlled laboratory conditions for further growth in larvae tanks as will now be described with reference to FIGS. 4 to 7.

The larvae tank comprises a base frame (7) in the form of a flat platform typically fabricated from welded steel pipe. As shown in FIG. 6 the pipes (8) may be shaped and welded together to form a grid-like frame having elongated sides (9), a pointed "bow" portion (10), various transverse frame rails (11), a central longitudinal rail (12) and auxiliary longitudinal rails (13). The base frame is provided with a floor surface typically formed from weld mesh steel floor welded to the floor frame to provide a base platform for the support of growing giant clams within the tank. The frame is also provided with a bow upright (14) braced to the central longitudinal rail (12) by way of a diagonal brace (15). The upright (14) may be provided with an anchor eye (16) and a towing eye (17) for the location and manipulation of the larvae tank.

The tank is further provided with a flexible non-permeable sheet material side wall (18) extending upwardly from the perimeter of the base frame (7) and a ring of buoyant material such as drums (19) extending around the upper edge of the side wall (18). The buoyant drums (19) are conveniently located within an elongate pocket or hem in the upper edge of the side wall which is preferably formed from a flexible polypropylene plastics material.

The tank may also be provided with closeable ports (18A) in the side walls (18) which may be opened at desired times to allow sea water to flow through the larvae tank. The ports are preferably provided with a filter mesh to prevent fertilized eggs from washing out of the tank or predators coming into the tank from the surrounding sea.

The tank is also provided with a layer of fine mesh net material (18B) inside the side wall (18) and also connecting the floats (19) with the base frame (7).

In use the larvae tank is placed in a desired position, frequently in a sheltered bay, and anchored in that position by anchor means attached to the anchor eye (16). The weight of the frame (7) is balanced against the buoyancy of the drum (19) such that the side wall (18) is tensioned to a desired degree and hangs downwardly as shown in FIG. 5. The degree of tensioning, controlled by the weight of the frame (7) is important to allow the side wall to flex with the motion of the water in which the tank is floating while preventing the side wall from becoming slack and then snapping into a tense situation which would be detrimental to the life of the polypropylene material from which the side wall is fabricated.

The fertilized giant clam eggs are placed within the larvae tank where they float freely and are isolated from the surrounding salt water environment by the non-permeable, flexible polypropylene sheet forming the side walls (18). The polypropylene sheet also extends across the floor of the tank formed by the frame (7) to totally isolated the interior of the tank from the surrounding salt water environment. The tank keeps the fertilized eggs isolated from predators such as zoeplancta while the thin wall of the polypropylene sheeting keeps the internal temperature of the tank within close proximity to the natural sea temperature. Due to the flexible nature of the side walls (18) and the buoyancy chambers (19), water movement within the tank is almost exactly the same as the water movement in the surrounding ocean, giving a natural environment to the fertilized eggs within the tank. This is a distinct advantage over placing the eggs in floating rigid tanks in which water would slosh vigorously around within the tank under wave motion, disturbing the fertilized eggs. Furthermore the flexible nature of the tank prevents the build up of high stresses within the walls of the tank permitting the shape of the tank to change and survive in rough water conditions.

The fertilized eggs grow into baby clams which are fed with cultured food placed within the tank until the clams grow to the point where they are metamorphised into sedentary form and settle on the bottom of the tank. This normally occurs two weeks after the fertilized eggs are placed within the tank. Once the juvenile clams have settled on the bottom of the tank the ports in the front and rear of the tank are opened permitting filtered sea water to flow through the tank bringing in natural food such as phytoplancta while flushing out wastes such as nitrates, nitrites and ammonium. The filter meshes across the ports prevents predators from entering the tank. In this manner the juvenile clam can be fed and grow in a natural environment while yet being protected and nurtured within the larvae tank.

After a further two to four weeks the polypropylene side walls (18) are removed leaving the base frame (7) suspended from the buoyancy drums (19) by the fine mesh layer previously located within the side walls. The mesh walls now permit the tide and currents to flow freely through the tank at all times supplying greater amounts of food to the growing giant clams and removing the natural waste products.

Figure 7:
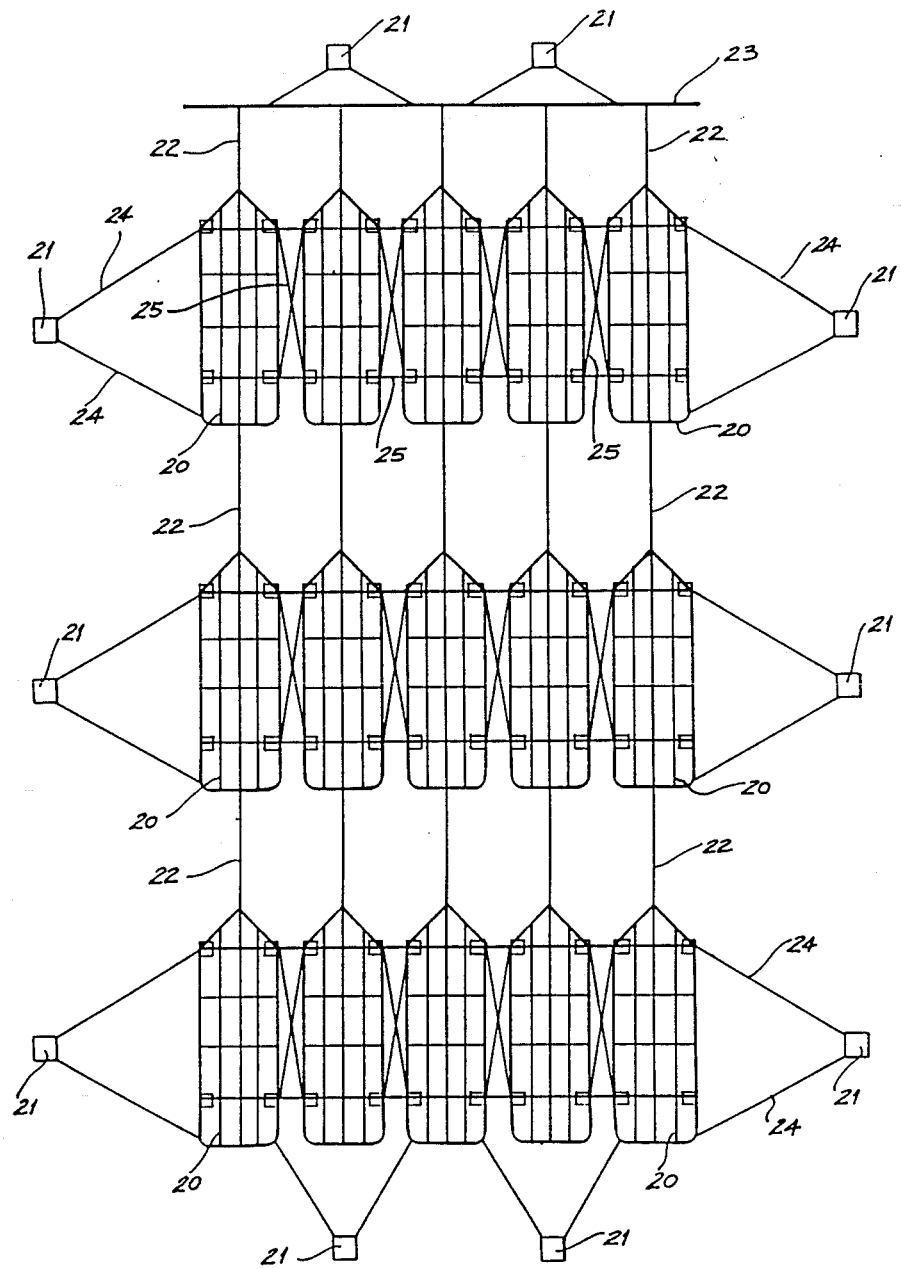
FIG. 7 is a diagrammatic plan view to a reduced scale of a plurality of larvae tanks of the type shown in FIG. 4 arranged in a convenient matrix for farming purposes.

Although the larvae tank has been described as a single isolated tank, and although the tank may conveniently be used in this manner, it is envisaged that a large number of such tanks would be rafted together into a giant clam farm of the type shown in FIG. 7. In this situation each tank is shown diagrammatically by its base frame (20) and the larvae tanks are shown in a five by three array conveniently located by anchor blocks (21) positioned as shown. Each larvae tank is located by a bow rope (22) attached to its anchor eye (16) (FIG. 4) the bow lines (22) from the tanks in the second and third rows being attached to the rear ends of the frames in the preceding rows, and bow lines from the tanks in the leading row being fastened to a suitable bridle (23) attached in turn to the anchor blocks as shown.

In each row of five tanks, the tanks are laterally located by anchor blocks (21) at each end of the row attached to the outermost tanks by bridles (24) and the tanks are interconnected by rigid cross frames (25) connected between each tank as shown.

In this manner a large number of larvae tanks may be rafted together to form a giant clam farm in a configuration which is particularly resistant to surviving the impact of tropical cyclones or other violent storms and yet which permits convenient access to the tanks for performing the various steps in the raising of the juvenile clams as described above.

Once the juvenile clams reach a certain size (typically 5-10 mm) they are removed from the larvae tank and enter the third phase by being placed inside a protected reef enclosure of the type shown in FIG. 8.

In the reef enclosure an area of the sea bed (26) is isolated and protected against predators by providing a mesh net (27) which extends upwardly from the sea bed and is supported at its upper edge by floats (28) which are typically formed from 20 liter plastic drums.

The enclosure is typically located in a reef area and the lower edge of the mesh wall (27) is fixed to the reef with suitable anchors such as star pickets (29) driven into the sea bed where the reef is hard. Alternatively where the sea bed is soft, the lower edge of the mesh wall can be tied to concrete slabs buried in the sea bed. The lower edge of the mesh wall is engaged with a half inch short link steel chain (31) wrapped in a hem at the foot of the mesh wall which is typically formed from 24 strand two inch prawn netting. The lower portion of the mesh wall is kept upright and prevented from chaffing on the sea bed by way of floats (30) fastened to the mesh wall at predetermined intervals.

The reef enclosure is typically large is size, e.g. 100 meters square and is designed to keep predators away from the growing giant clams. The giant clams removed from the larvae tanks are placed in the sea bed within the reef enclosure where they are left to grow to adult clam size for marketing or for placement back into the natural environment on the reef.

In this manner a method of breeding and raising giant clams is provided which enables the clams to be bred and raised in a natural fashion, with a low attrition rate, and to provide a viable method of raising giant clams both for marketing and to replace depleted stocks of wild giant clams.

What we claim is:

1. A method of farming shell fish, such as giant clams, comprising the steps of placing fertilized eggs in a tank floating in sea water, said tank having flexible non-rigid, non-permeable sides and a base frame having a substantially flat support platform for support of growing shell fish, the entire support platform being substantially rigid, feeding the eggs as they grow to juvenile clams and settle on the platform at the bottom of the tank, allowing filtered water to pass through the tank once the juvenile clams have metamorphosed into sedentary form, allowing the clams to grow to a predetermined size, and removing the clams from the tank.

2. A method of farming shell fish such as giant clams comprising the steps of placing fertilized eggs in a tank floating in sea water, said tank having flexible non-peremeable sides, feeding the eggs as they grow to juvenile clams and settle on the bottom of the tank, allowing filtered sea water to pass through the tank once the juvenile clams have metamorphised into sedentary form, replacing the flexible non-permeable sides of the tank by a fine mesh-like material allowing free movement of sea water through the tank, once the juvenile clams have grown to a desired size, allowing the clams to grow to a predetermined size, and removing the clams from the tank.

3. A method of farming shell fish such as giant clams comprising the steps of breeding adult giant clams to obtain fertilized eggs by placing adult giant clams into a floating breeding tank supported by buoyance chambers, controlling the environment in the floating breeding tank to encourage the giant clams to breed, obtaining eggs and sperm separately from the giant clams in the breeding tank and mixing the eggs and sperm in controlled laboratory conditions before placing the fertilized eggs in a flexible larvae tank, placing the fertilized eggs in the flexible larvae tank floating in sea water, said tank having flexible non-permeable sides, feeding the eggs as they grow to juvenile clams and settle on the bottom of the tank, allowing filtered sea water to pass through the tank once the juvenile clams have metamorphised into sedentary form, allowing the clams to grow to a predetermined size, and removing the clams from the tank.

4. A larvae tank for growing and raising fertilized eggs of shell fish, such as giant clams, said larvae tank comprising a base frame having a substantially flat support platform for the support of growing shell fish, a flexible non-rigid sheet material side wall extending upwardly from the perimeter of the base frame, the entire support platform being substantially rigid, a ring of buoyant material extending around the upper edge of the side wall adapted to support the tank when floating in water, and anchor means arranged to locate the tank at a desired position relative to the sea bed.

5. A larvae tank as claimed in claim 4 wherein the side wall is formed from flexible sheet plastics material extending across the base frame and then upwardly from the perimeter of the base frame, and being wrapped around the buoyant material at the upper edge of the side wall.

6. A larvae tank as claimed in claim 4 wherein the base frame is weighted to provide a predetermined downward force on the flexible side wall, opposed to the buoyant upward force from the buoyant material at the upper edge of the side wall, such that the side wall is tensioned to a predetermined degree in use allowing the side wall to flex with natural movement of water thereagainst, but keeping the side walls sufficiently tensioned to resist sudden tensioning from a slack to a highly tensioned condition under wave action.

7. A larvae tank for growing and raising fertilized eggs of shell fish such as giant clams, said larvae tank comprising a base frame having a substantially flat platform for the support of growing shell fish, a flexible sheet material side wall extending upwardly from the perimeter of the base frame, a ring of buoyant material extending around the upper edge of the side wall adapted to support the tank when floating in water, and anchor means arranged to locate the tank in a desired position relative to the sea bed, wherein a layer of fine mesh netting located alongside the flexible sheet material side wall and arranged such that at a predetermined point in the growth of giant clams within the tank, the flexible sheet material side wall may be removed, leaving the fine mesh netting in place and allowing water to pass through the tank being filtered by the fine mesh.

8. A method of farming shell fish, such as giant clams, comprising the steps of placing fertilized eggs in a tank floating in sea water, said tank having flexible non-permeable sides and a base frame having a substantially flat platform for support of growing shell fish, feeding the eggs as they grow to juvenile clams and settle on the platform, allowing filtered sea water to pass through the tank once the juvenile clams have metamorphosed into sedentary form by opening filter ports in the flexible, non permeable sides of the tank, allowing the clams to grow to a predetermined size, and removing the clams from the tank.

9. A larvae tank for growing and raising fertilized eggs of shell fish, such as giant clams, said larvae tank comprising a base frame having a substantially flat platform for the support of growing shell fish, a flexible sheet material side wall extending upwardly from the perimeter of the base frame, the side wall being provided with at least one pair of port means on opposite sides of the tank which can be opened to permit salt water, in which the tank is floating, to pass through the tank, the port means being provided with a filter mesh adapted to keep predators from passing into the tank and retain any floating clams or fertilized eggs within the tank, a ring of buoyant material extending around the upper edge of the side wall adapted to support the tank when floating in water, and anchor means arranged to locate the tank at a desired position relative to the sea bed.

* * * * *